Patented Nov. 19, 1929

1,736,743

UNITED STATES PATENT OFFICE

WILLIAM F. GEHRIG, OF BERKLEY HEIGHTS, NEW JERSEY

DETONATING FIREWORK COMPOSITION

No Drawing. Application filed March 5, 1928. Serial No. 259,377.

This invention relates to fireworks, which are set in action by means of friction, or impact, or heat, and which during combustion thereof produce a succession of explosive detonations or reports; the action taking place in such a manner that the article does not explode in mass but burns with a relatively slow combustion accompanied by rapid intermittent, small and harmless explosions.

Heretofore such form of fireworks have been made with poisonous yellow phosphorus, potassium chlorate and an organic binding material, such as shellac or gum.

In order to avoid the use of the poisonous yellow phosphorus, it has been proposed to use sulphur phosphorous compounds and particularly sesquisulphide of phosphorus as the active agent with oxygen producing element in the form of potassium chlorate or its equivalent, the mixture being bound together in intimate mixture by a cementitious binder comprising magnesium chloride and magnesium oxide. It has been found, however, that such a form of binder is not altogether satisfactory, for the reason that the magnesium chloride ingredient thereof is very hygroscopic particularly in contact with or in the near presence of potassium chlorate, and that the finished article is sensitive to climatic changes, tending to crumble and deteriorate in damp or humid weather.

It is the primary object of the instant invention to provide an ingredient which will overcome the tendency to take on water by the mixture of the character described which includes potassium chlorate, magnesium oxide, and magnesium chloride, or their equivalents, whereby the mixture is not sensitive to moisture and will therefore not readily deteriorate under changing climatic or weather conditions, but will remain firm and hard at all times so as to be properly operative when put to the use for which it is intended; and to this end I add to a binder comprising magnesium oxide and magnesium chloride a quantity of chrome alum or an equivalent thereof such as ordinary alum.

The binder of magnesium oxide and magnesium chloride when it has chrome alum, in the proportions hereinafter set forth, mixed therewith is non-hygroscopic and produces a hard inorganic cementitious material through which the phosphorous sulphur compound and oxygen producing materials can be dispersed and retained in that closely incorporated relation to effect the character of combustion producing the successive or intermittent small explosion or reports rather than relatively slow flaming combustion which it is desired to avoid. Further, the magnesium chloride in the cement mix produces a gummy viscous material which leaves very little space between the molecules of the insoluble materials of the composition and which dries or sets in this space filling relation so that a slow or retarded burning is effected with consequently louder segregated explosions. And the composition will be, and will continue to be, dry and non-hygroscopic through various changes in climatic conditions such as changes of temperature and changes to and from high degrees of humidity when potassium chlorate is used as the oxygen producing material above referred to.

In making up the novel firework composition of this invention, the phosphorous sesquisulphide is introduced in a water mixture of potassium chlorate to which has been added a cementitious mixture consisting of magnesium oxide and magnesium chloride. With the cementitious mixture of magnesium oxide and magnesium chloride is added a quantity of chromium potassium sulphate as a material for preventing the mixture from being hygroscopic after the material has been dried. To this mixture there can be added an inert filler such as beach-sand or iron oxide, but preferably the latter is used and in the form of red oxide of iron, that is $Fe_2O_3$, whereupon the mixture is then formed into discs or other shapes or spread on a suitable surface and dried. The sulphur phosphorous compound, e. g., phosphorous sesquisulphide, is first transformed into crystals of appropriate size, that is, fairly coarse grains, by recrystalizing with carbon bisulphide or other suitable solvents. The potassium chlorate is preferably utilized in powder form.

In the preferred form of the invention a water insoluble coating or film is provided over each of the crystals of phosphorous sesquisulphide to protect them from the water used in the cement mixture. This is necessary because, as is well known, phosphorous sesquisulphide, like other phosphorous sulphur compounds, is decomposed by water. This protection is particularly necessary in the compositions of the invention in which chlorates are used, because the latter produces mixtures with sulphur which are very free burning and which can destroy or deleteriously effect the function of the composition in producing series of detonating explosions. Further chlorites, which can be formed from the chlorates in the mixture, will act to decompose the sulphur phosphorous compounds. The coating or film on the sulphur phosphorous crystals is effective as protection against these results and effects. This coating or film can also serve to aid the cementing material in protecting these materials from atmospheric moisture, particularly in moist climates where the finished composition may be subjected to moisture condensed from the air. The film or coating produced, while effective in protecting the phosphorous sesquisulphide from moisture, will not detract from its function in producing detonating explosions, rather it will aid in that function by somewhat confining the material so that the explosions give loud reports. Further, the protective film or coating will not prevent or retard contact, between the phosphorous sesquisulphide and the oxygen produced for explosive action therewith because the film or coating at localized places will be removed or destroyed or made pervious to the oxygen by abrasive friction or by heat used to set off a series of explosions or by heat or force of an explosion at an adjacent part.

Materials which I find suitable for coating phosphorous sesquisulphide crystals for use in an explosive designed to produce a series of detonations or loud reports are cellulose acetates, cellulose nitrates, for example, collodion, and resinous gums such as kauri, copal, shellac, or other material which can be taken up by and deposited in a film from a suitable solvent, other than water, and which when deposited in a film is effectively impervious to water.

To produce a film or coating of collodion thereon the phosphorous sesquisulphide crystals can be dipped in a collodion bath and, after being drained of excess collodion, set to dry at room or raised temperature. Similarly a dry coating or film of other cellulose nitrate preparation, or cellulose acetate, or resin gum such as kauri or copal can be applied with suitable solvent such as alcohol, ether, petroleum oils, carbon bisulphide, benzene, etc., and dried therefrom.

The phosphorous sesquisulphide crystals can also be protected by dipping them in a water gel which is in the liquid state previous to setting, draining off excess jelly, and setting to dry or jell in a cool place. Bone jelly, calf's foot or the like are suitable. Although these contain water they are effective in moisture protection because they take on water by hydrolysis when they set and after they set.

As an example of the composition of this invention, the ingredients are mixed together in the following proportions by weight;

| | Parts |
|---|---|
| Potassium chlorate | 35 |
| Magnesium oxide | 35 |
| Magnesium chloride | 10 |
| Chromium potassium sulphate | 1 |
| Sesquisulphide of phosphorus | 12 |
| $Fe_2O_3$ | 8 |

To these ingredients can be added beach-sand as a filler of approximately eight per cent by weight of the total mass.

The preferred manner of preparing the composition is as follows:

I dissolve one part by weight of chromium potassium sulphate (chrome alum) in water, and then add thereto 35 parts of potassium chlorate, and thereupon adding in the desired quantity of the filler of beach-sand or red iron oxide or a mixture of beach-sand and red iron oxide, about 8 parts. These ingredients are thoroughly intermixed and stirred into a thick paste. Into the resultant paste I then add 35 parts of magnesium oxide and 10 parts of magnesium chloride and stir in the same, and finally I add about 12 parts of phosphorous sesquisulphide, mixing in very thoroughly to disperse the same throughout the mass. After the paste is thus produced I form discs or bodies thereof of desired size, for example, a disc one quarter inch thick and one-half inch in diameter, which are dried at temperatures of from 40° to 70° C.; or the paste can be disposed on paper strips or sheets in the form of segregated spots or pellets; or the paste can be dispersed on or in a fuse material; in any case when dried the same will provide a combustible composition or mixture which, when ignited, will burn in such a manner as to produce the desired series or rapid succession of detonations or explosions.

The composition, when dried, provides a relatively hard dense mass which is non-hygroscopic so that it keeps well under various climatic or weather conditions, and will remain properly operative for the purposes intended.

The composition of the kind described possesses, in addition to the keeping qualities above mentioned, the highly desired advantage of being free from poisonous substances.

It is to be understood that chlorates other than potassium chlorate can be used, such for example, as sodium chlorate, magnesium chlorate or calcium chlorate, or perchlorate of the metals involved; and that in place of either or both of the magnesium oxide and magnesium chloride other alkali compounds equivalent to these can be used, such for example, as barium oxide, sodium chloride, patassium chloride, barium chloride, and carbonates will be used to replace the oxides or some of them. It is also to be understood that the chrome alum can be replaced, either in whole or in part, by a material, such for example, as ordinary alum, potassium aluminum sulphate, or any other alum such as are characterized as a complex sulphate and as a sulphate of a trivalent element, such as aluminum, iron, chromium or magnesium and a sulphate of a monovalent element, for example, as sodium, potassium, or ammonium. It is recognized that the alums have water of crystallization contained therein and it is, of course, intended that such is the case in the alums used herein.

It is also well-known that red oxide of iron is hygroscopic but in the mixture of the invention the prepared composition or mixture is non-hygroscopic and it is considered that the alum used is effective in preventing both the magnesium chloride and the red oxide of iron from exhibiting this characteristic or at least in preventing the effect of this characteristic from appearing in the finished product.

The sulphur phosphorous compounds which can be used are, in addition to sesquisulphide of phosphorus, the mono, tri, tetra, and penta sulphides.

Having thus described my invention, I claim:

1. A non-hygrosopic firework composition adapted to produce successive detonations when ignited, comprising at least one sulphur phosphorous compound as its active agent; at least one chlorate producing oxygen; an inorganic binder consisting of alkali earth metal chloride and an alkali earth metal oxide; and an alum.

2. A non-hygroscopic firework composition adapted to produce successive detonations when ignited, comprising, at least one sulphur phosphorous compound as its active agent; at least one chlorate producing oxygen; an inorganic binder consisting of an alkali earth metal chloride and an alkali earth metal oxide; a qualifying material consisting in an alum; and red oxide of iron.

3. A non-hygroscopic firework composition adapted to produce successive detonations when ignited, comprising, phosphorous sesquisulphide as its active agent; at least one chlorate as the oxygen producing substance; an inorganic binder consisting of magnesium chloride and magnesium oxide; red iron oxide; and an alum.

4. A non-hygroscopic firework composition adapted to produce successive detonations when ignited, comprising, sesquisulphide of phosphorus; potassium chlorate; a binder consisting of magnesium oxide and magnesium chloride; and an alum.

5. A non-hygroscopic firework composition adapted to produce successive detonations when ignited, comprising sesquisulphide of phosphorus; potassium chlorate; a binder consisting of magnesium oxide and magnesium chloride; an alum; and a filler material.

6. A non-hygroscopic firework adapted to produce successive detonations when ignited, comprising, sesquisulphide of phosphorus; potassium chlorate; a binder consisting of magnesium oxide and magnesium chloride; an alum; and red iron oxide.

7. A non-hygroscopic firework adapted to produce successive detonations when ignited, consisting of the herein named ingredients in the approximate proportions by weight as follows:

| | Parts |
|---|---|
| Potassium chlorate | 35 |
| Magnesium oxide | 35 |
| Magnesium chloride | 10 |
| Chromium potassium sulphate | 1 |
| Sesquisulphide of phosphorus | 12 |

8. A non-hygroscopic firework adapted to produce successive detonations when ignited, consisting of the herein named ingredients in the approximate proportions by weight as follows:

| | Parts |
|---|---|
| Potassium chlorate | 35 |
| Magnesium oxide | 35 |
| Magnesium chloride | 10 |
| Chromium potassium sulphate | 1 |
| Red oxide of iron | 8 |
| Sesquisulphide of phosphorus | 12 |

9. A non-hygroscopic firework composition adapted to produce successive detonations when ignited, comprising, at least one sulphur phosphorous compound as its active agent; at least one chlorate producing oxygen; an alum and an inorganic binder; said sulphur phosphorous compound being in crystals with a coating on said crystals of a material insoluble in water.

10. A non-hygroscopic firework composition adapted to produce successive detonations when ignited, comprising, at least one sulphur phosphorous compound as its active agent; at least one chlorate producing oxygen; an inorganic binder consisting of an alkaline earth metal oxide and chloride; and an alum; said sulphur phosphorous compound being in crystals with a coating on said crystals of a material insoluble in water.

11. A non-hygroscopic firework composition adapted to produce successive detonations when ignited, comprising, sesquisulphide of phosphorus; potassium chlorate; a binder consisting of magnesium oxide and magnesium chloride; and an alum; said sulphur phosphorous compound being in crystals with a coating on said crystals of a material insoluble in water.

12. A non-hygroscopic firework adapted to produce successive detonations when ignited, consisting of the herein named ingredients in the approximate proportions by weight as follows:

| | Parts |
|---|---|
| Potassium chlorate | 35 |
| Magnesium oxide | 35 |
| Magnesium chloride | 10 |
| Chromium potassium sulphate | 1 |
| Sesquisulphide of phosphorus | 12 | said sulphur phosphorous compound being in crystals with a coating on said crystals of a material insoluble in water.

13. A non-hygroscopic firework adapted to produce successive detonations when ignited, consisting of the herein named ingredients in the approximate proportions by weight as follows:

| | Parts |
|---|---|
| Potassium chlorate | 35 |
| Magnesium oxide | 35 |
| Magnesium chloride | 10 |
| Chromium potassium sulphate | 1 |
| Red oxide of iron | 8 |
| Sesquisulphide of phosphorus | 12 | said sulphur phosphorous compound being in crystals with a coating on said crystals of a material insoluble in water.

14. A firework composition adapted to produce successive detonations when ignited, comprising, a sulphur phosphorous compound as an active agent; an oxygen producing chlorate; an alum and a binder; said sulphur phosphorous compound being in small particles or bodies with a coating thereon of material adapted to protect said particles or bodies from water or moisture.

In testimony, that I claim the invention set forth above I have hereunto set my hand this 2nd day of March, 1928.

WILLIAM F. GEHRIG.